United States Patent
Yanaka et al.

(10) Patent No.: US 11,366,447 B2
(45) Date of Patent: Jun. 21, 2022

(54) SPATIAL ACCURACY CORRECTION METHOD AND APPARATUS

(71) Applicant: MITUTOYO CORPORATION, Kanagawa (JP)

(72) Inventors: Shinichiro Yanaka, Ibaraki (JP); Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 860 days.

(21) Appl. No.: 16/218,902

(22) Filed: Dec. 13, 2018

(65) Prior Publication Data
US 2019/0187660 A1 Jun. 20, 2019

(30) Foreign Application Priority Data
Dec. 14, 2017 (JP) .............................. JP2017-240065

(51) Int. Cl.
G05B 19/401 (2006.01)
G01B 9/02055 (2022.01)
G01B 21/04 (2006.01)

(52) U.S. Cl.
CPC ......... G05B 19/401 (2013.01); G01B 9/0207 (2013.01); G01B 9/02071 (2013.01);
(Continued)

(58) Field of Classification Search
USPC ...................... 33/503, 502; 702/150; 73/1.79
See application file for complete search history.

(56) References Cited

U.S. PATENT DOCUMENTS 8,452,564 B2 * 5/2013 Balsamo .............. G01B 21/042
73/1.79
8,659,763 B2 * 2/2014 Kahle .................. G05B 19/401
356/498
(Continued)

FOREIGN PATENT DOCUMENTS

DE 102007004934 A1 7/2008
WO WO93/08449 A1 4/1993

OTHER PUBLICATIONS

Kenta Umetsu et al., "Geometric Calibration of a Coodinate Measuring Machine Using a Laser Tracking System", Measurement Science and Technology, vol. 16, Issue 12, Nov. 9, 2005, pp. 2466-2472.
(Continued)

*Primary Examiner* — Christopher W Fulton
(74) *Attorney, Agent, or Firm* — Greenblum & Bernstein, P.L.C.

(57) ABSTRACT

A spatial accuracy correction apparatus performs a spatial accuracy correction of a positioner displacing a displacer to a predetermined set of spatial coordinates using a measurable length value measured by an interferometer and a measurable value of the set of spatial coordinates of the displacement body that is measured by the positioner. The measured length value and the measured value for each measurement point are acquired by displacing the displacement body to a plurality of measurement points in order, one or more repeated measurements are conducted for at least one of the plurality of measurement points being measured after conducting measurement of the measured length value and the measured value for each of the plurality of measurement points, and the plurality of points are measured again when a repeat error of the measured length value is equal to or greater than a threshold value.

15 Claims, 7 Drawing Sheets

(52) U.S. Cl.
CPC ....... *G01B 9/02072* (2013.04); *G01B 21/045* (2013.01); *G01B 2290/15* (2013.01); *G05B 2219/37275* (2013.01); *G05B 2219/39033* (2013.01); *G05B 2219/41094* (2013.01); *G05B 2219/50057* (2013.01)

(56) References Cited

U.S. PATENT DOCUMENTS

| | | |
|---|---|---|
| 9,746,303 B2 | 8/2017 | Nakagawa et al. |
| 10,030,972 B2 * | 7/2018 | Iseli .................... G01B 21/042 |
| 2018/0058832 A1 | 3/2018 | Nakagawa et al. |
| 2018/0058847 A1 | 3/2018 | Nakagawa et al. |
| 2019/0187661 A1 * | 6/2019 | Yanaka ................ G05B 19/401 |

OTHER PUBLICATIONS

U.S. Appl. No. 16/219,033 to Shinichiro Yanaka et al., filed Dec. 13, 2018.

Office Action issued in China Counterpart Patent Appl. No. 201811531591.X, dated Jul. 1, 2021, along with an English translation thereof.

\* cited by examiner

RELATED ART

SPATIAL ACCURACY CORRECTION METHOD AND APPARATUS

CROSS-REFERENCE TO RELATED APPLICATIONS

The present application claims priority under 35 U.S.C. § 119 of Japanese Application No. 2017-240065, filed on Dec. 14, 2017, the disclosure of which is expressly incorporated by reference herein in its entirety.

BACKGROUND OF THE INVENTION

1. Field of the Invention

The present invention relates to a spatial accuracy correction method and apparatus that correct an error in positioning in a positioning mechanism that positions a displacement body at a predetermined set of spatial coordinates.

2. Description of Related Art

Conventionally, a positioning mechanism is known that positions (displaces) a displacement body at a predetermined coordinate position in space (spatial coordinates). Examples of such positioning mechanisms may include a coordinate measuring machine (CMM) that displaces a measurement probe to measure a shape of an object, a machine tool that displaces a processing tool to process an object, a robot that displaces an arm to a predetermined position, and the like.

In a positioning mechanism of this kind, a displacement body must be positioned accurately at a predetermined set of spatial coordinates, and in order to achieve this, spatial accuracy correction methods have been proposed in which, for each axis in a positioning mechanism, translational error, rotational error, and squareness error between axes is corrected appropriately, and errors in positioning are reduced (see, for example, Umetsu et al. (2005) and the specification of German Patent No. 102007004934). The method described in Umetsu et al. performs spatial accuracy correction with a multilateration method, using a tracking-type laser interferometer. In addition, the method described in German Patent No. 102007004934 changes a position of a retroreflector attached to a tip of a Z spindle of a CMM to four or more locations, and measures the positions of the retroreflector in each location using the CMM. Also, simultaneously with this, a change in a distance to the retroreflector is measured by a tracking-type laser interferometer that is within a measurement range of the CMM or positioned in the vicinity thereof. Then, based on these measured values, a position of a rotation center of the tracking-type laser interferometer and an absolute distance from the rotation center of the tracking-type laser interferometer to the retroreflector are calculated with the multilateration method.

Here, a spatial accuracy correction method of a conventional positioning mechanism is described concretely. FIG. 7 illustrates a spatial accuracy correction apparatus that carries out the spatial accuracy correction method of the positioning mechanism (in this example, a CMM 10 is described). In FIG. 7, a spatial accuracy correction apparatus 90 uses a CMM 10, a tracking-type laser interferometer 20, and a PC 99. The spatial accuracy of the CMM 10 is to be corrected.

The CMM 10 includes a Z spindle 102 to which a measurement probe 101 is affixed, an X guide 103 holding the Z spindle 102 so as to be capable of displacement in an X direction, and a column 104 to which the X guide 103 is affixed and which is capable of displacement in a Y direction. Also, although not shown in the drawings, the CMM 10 further includes, for example, a Y displacement mechanism displacing the column 104 in the Y direction, an X displacement mechanism displacing the Z spindle 102 over the X guide 103 in the X direction, a Z displacement mechanism displacing the Z spindle 102 in a Z direction, and various scales which measure the spatial coordinates of the measurement probe 101 and the Z spindle 102 based on an amount of displacement of each displacement mechanism, for example. A retroreflector 105 is also installed at a tip of the measurement probe 101. The measurement probe 101 may also be detached and the retroreflector 105 mounted to a tip position of the Z spindle 102.

The tracking-type laser interferometer 20 is installed within a measurement range of the CMM 10, or in the vicinity thereof. The tracking-type laser interferometer 20 tracks the retroreflector 105 and measures a distance from a rotation center M of the tracking-type laser interferometer 20 to the retroreflector 105.

The PC 99 is a computer connected to the CMM 10 and the tracking-type laser interferometer 20. The PC 99 controls the CMM 10 and the tracking-type laser interferometer 20, and simultaneously performs coordinate measurement with the CMM 10 and length measurement with the tracking-type laser interferometer 20.

In this example, the tracking-type laser interferometer 20 normally cannot measure an absolute distance. Accordingly, using the method described in German Patent No. 102007004934, a position M of a rotation center of a tracking-type laser interferometer (hereafter abbreviated as a rotation center M) and an absolute distance from the rotation center M to the retroreflector 105 are calculated with the multilateration method. Then, a measured length value d acquired by the tracking-type laser interferometer 20 is preset such that the measured length value d indicates the absolute distance from the rotation center M to the retroreflector 105. However, coordinates ($x_m$, $y_m$, $z_m$) of the rotation center M that are calculated at this point and a preset value of the measured length value d acquired by the tracking-type laser interferometer 20 are values found with the accuracy of the CMM 10 prior to correction and are not very accurate values. Therefore, when a spatial accuracy correction parameter Bα (hereafter abbreviated as a correction parameter Bα) for the CMM 10 is calculated, correction constants can be respectively applied to each value as an unknown quantity, and the optimal solution for the correction constants can be calculated together with the correction parameter Bα.

After the presetting described above, the position of the retroreflector 105 (hereafter referred to as a measurement point X) is modified and a plurality of the measurement points X are measured. Then, after that, a stylus offset (relative position of the retroreflector 105 with respect to the tip of the Z spindle 102 of the CMM 10) and the position of the rotation center M of the tracking-type laser interferometer (installation position of the tracking-type laser interferometer 20) are modified, and a plurality of measurement points X (a total of several thousand points) are measured. After the position of the rotation center M is modified, and after the stylus offset is modified, the coordinates of the rotation center M and the preset value of the measured length value d change, and therefore presetting is performed again. Therefore, a different value is applied to the position of the rotation center M ($x_m$, $y_m$, $z_m$) and the preset value of the measured length value d each time the position of the rotation center M changes, and each time the stylus offset changes.

In the measurement of the measurement point X, a measured value $X_{CMM}$ ($x_{CMM}$, $y_{CMM}$, $z_{CMM}$) of the measurement point X acquired by the CMM 10 and the measured length value d acquired by the tracking-type laser interferometer 20 are measured simultaneously. Also, because the multilateration method is used, the rotation center M of the tracking-type laser interferometer 20 changes to and is measured at at least four different positions. Then, after the measurement of all measurement points X has ended, a correction parameter of the CMM 10 is calculated from the measured data ($X_{CMM}$, d). In the calculation of the correction parameter, the measured data measured at the several thousand measurement points X is substituted into Expressions (1) and (2) below, simultaneous equations for the several thousand Expressions (1) and (2) are prepared, and the correction parameter Bα of the CMM 10 is found by solving the equations using the least square method, as in Umetsu et al., for example.

[Formula 1]

$$\delta p \equiv [\delta x \quad \delta y \quad \delta z]^T = HB\alpha \quad (1)$$

$$\sqrt{\begin{aligned}&\{(x_{CMM} + \delta x) - (x_m + f_{xm})\}^2 + \{(y_{CMM} + \delta y) - (y_m + f_{ym})\}^2 + \\ &\{(z_{CMM} + \delta z) - (z_m + f_{zm})\}^2\end{aligned}} = \quad (2)$$

$$(d + F_d)$$

In Expression (1), $\delta p \equiv (ax, \delta y, \delta z)^T$ is a matrix of an error in the measured values $X_{CMM}$ acquired by the CMM 10 at each measurement point X, and specifically is an error between the actual position of the retroreflector 105 and the measured value $X_{CMM}$. The superscript character "T" represents a transposed matrix. Bα is a matrix of correction parameters for the CMM 10 expressed by a B-spline function, B is a matrix of basis functions of B-spline functions, and a is a matrix of coefficients for the basis functions. H is a matrix converting the correction parameter Bα to an error δp of the measured value $X_{CMM}$, and is a known matrix configured from a mechanical structure and stylus offset information for the CMM 10 to be corrected. Also, the left and right sides of Expression (2) express, respectively, the measured value $X_{CMM}$ for the CMM 10 and the distance from the rotation center M to the retroreflector 105, which is expressed by the measured length value d of the tracking-type laser interferometer 20. As noted in the above description, $x_m$, $y_m$, and $z_m$ are respectively x, y, and z components of the coordinates of the rotation center M measured in the presetting. $F_d$ is a correction constant for the preset value of the measured length value d (hereafter referred to as a first correction constant $F_d$), and $f_{xm}$, $f_{ym}$, and $f_{zm}$ are respectively x, y, and z components of a correction constant $F_M$ for the coordinates of the rotation center M (hereafter referred to as a second correction constant $F_M$). The first correction constant $F_d$ and the second correction constant $F_M$ are both unknown quantities, and a different correction constant is applied each time the position of the rotation center M of the tracking-type laser interferometer is changed and each time the stylus offset is changed. These correction constants can be found, together with the correction parameter Bα, when solving the simultaneous equations of Expressions (1) and (2). The spatial accuracy of the CMM 10 to be corrected can be corrected using the correction parameter Bα, which is found as described above.

Non-Patent Literature

Umetsu, Kenta and Ryosyu Furutnani, Sonko Osawa, Toshiyuki Takatsuji, and Tomizo Kurosawa. "Geometric calibration of a coordinate measuring machine using a laser tracking system." *Measurement Science and Technology* 16.12 (2005): 2466-2472.

In a spatial accuracy correction method such as that described above, the tracking-type laser interferometer 20 measures length with the rotation center M as a reference point. However, when the position of the rotation center M becomes offset with respect to a coordinate origin point of the CMM 10 due to temperature drift or an external impact, for example, an error due to the positional offset of the rotation center M may be incorporated into the measured length value d of the tracking-type laser interferometer 20. In such a case, a determination cannot be made as to whether the error described above is incorporated into the measured length value d and the effects of the positional offset of the rotation center M applied to the measured length value d cannot be inhibited by the methods of German Patent No. 102007004934 or Umetsu et al., described above. Accordingly, spatial accuracy correction is performed with the error included, which presents an issue of being unable to conduct a high-accuracy correction process.

SUMMARY OF THE INVENTION

The present invention provides a spatial accuracy correction method and apparatus having a high degree of correction accuracy.

A spatial accuracy correction method according to the present invention is a method that includes a positioning mechanism displacing a displacement body to a predetermined set of spatial coordinates, the positioning mechanism also having a retroreflector mounted to the displacement body, and a laser interferometer having a reference point and measuring a distance from the reference point to the retroreflector, the method performing spatial accuracy correction of the positioning mechanism using a measured length value measured by the laser interferometer and a measured value for spatial coordinates of the retroreflector measured by the positioning mechanism. The method includes a measurement step in which the retroreflector is displaced to the plurality of measurement points in order, and the measured length value and the measured value at each of the measurement points are acquired. In the measurement step, after measuring the measured length value and the measured value for each of the plurality of measurement points, at least one or more repeated measurement is conducted for at least one of the plurality of measured measurement points. When an error in the measured length value which is repeatedly measured with respect to the measurement point that has undergone the repeated measurement is equal to or greater than a predetermined threshold value, the plurality of measurement points are measured again.

In this example, a repeat error can be found by a difference between the maximum value and the minimum value among the plurality of measured length values being acquired with respect to the measurement points that have undergone the repeated measurement, for example. In the present invention, after measuring the measured value and the measured length value with respect to the plurality of measurement points, the repeat measurement is conducted for at least one of the measurement points being measured. Then, the repeat error of the measurement point that has undergone the repeated measurement is determined whether the error is equal to or greater than a predetermined threshold value. When the repeat error is determined to be equal to or greater than the threshold value, the measurement is conducted again for the plurality of measurement points. When the repeat error is equal to or greater than the threshold value, position of the laser interferometer (position of the reference point) may be displaced due to temperature drift or an external impact and error is incorporated in the measured length value. In such a case, there is a possibility that the error is incorporated into the measurement points onward the measurement point that has undergone the repeated measurement. When a correction parameter is calculated based on the measured value before conducting the repeated measurement, a high-accuracy correction cannot be performed. In contrast, in the present invention, when the repeat error is equal to or greater than the threshold value, measurement is conducted again for the plurality of measurement points. Accordingly, an appropriate measured length value can be acquired with respect to the each measured point and high accurate correction parameter can be calculated.

In the spatial accuracy correction method according to the present invention, preferably, in the measurement step, a plurality of measurement points are divided into a plurality of measurement lines and after measurement of the measured length value and the measured values of all the measured points belonging to each of the measurement lines is ended, at least one or more repeated measurement is conducted for at least one of the measurement points belonging to the measurement line.

In the present invention, the plurality of measurement points are divided into a plurality of measurement lines that include a predetermined number Ka of measurement points for example, and the repeated measurement is conducted for each measurement line. In such a case, compared to a case where all the plurality of measurement points are measured again, appropriate measured value and measured length value with respect to the each measurement point can be acquired rapidly.

In the spatial accuracy correction method according to the present invention, preferably, the method includes a parameter calculation step in which the correction parameter of the spatial accuracy correction of the positioning mechanism is calculated based on the measured value, the measured length value, and the coordinates of the reference point of the laser interferometer. In the parameter calculation step, the correction parameter is preferably calculated by applying a first correction constant to the measured length value and a second correction constant to the coordinates of the reference point for each measurement line.

The first correction constant is a constant to correct deviation of the measured length value and the second correction constant is a constant to correct the positional offset of the reference point coordinates of the laser interferometer. In the present invention, in the parameter calculation step, the second correction constant, which is respectively different for each measurement line is applied to the reference point coordinate of the laser interferometer of each measurement point and the first correction constant, which is respectively different for each line is applied to measured length value. In such a case, for example, measured value and the measured length value with respect to each measurement point is substituted into Expressions (1) and (2) mentioned above and simultaneous equation is prepared and appropriate value for the first correction constant and the second correction constant and correction parameter Bα can be found simultaneously by solving the simultaneous equation. In such a case, for example, in a case where the positional offset of the reference point of the laser interferometer (a rotation center M of a tracking-type laser interferometer described in German Patent No. 102007004934, for example) gradually increases during measurement, the first correction constant and the second correction constant, which are respectively different for each measurement line, are applied and therefore, the influence can be inhibited, and a highly accurate correction parameter can be calculated.

In the spatial accuracy correction method of the present invention, at least one or more measurement points that undergo the repeated measurement is preferred to include the measurement point initially measured on the measurement line. In the present invention, when the repeated measurement is conducted, the initial measurement point being measured is included as a measurement point for the repeated measurement. When the position of the tracking-type laser interferometer becomes offset due to temperature drift or an external impact during measurement of the plurality of measurement points, the measured length value from the repeated measurement at the measurement point initially being measured is always different from the measured length value prior to the repeated measurement. Therefore, by having the measurement point initially being measured undergo the repeated measurement, a determination can be made easily and rapidly whether the measurement should be conducted again for the plurality of measurement points.

According to the spatial accuracy correction method of the present invention, in the repeated measurement, preferably, the plurality of measurement points are measured in a reverse order of the measurement of the plurality of measurement points being measured most recently. In the present invention, when the repeated measurement is conducted, measurement is conducted in the reverse order of the measurement of the plurality of measurement points being recently measured. Accordingly, when the measured length value is gradually increased or decreased by temperature drift and the like, for example, it is possible to cancel out the effect by temperature drift by finding the least square value between the measured length value at each measurement point from the repeated measured and the measured length value of each of recent measurement points, for example. In addition, when temperature drift is occurred while the repeated measurement is conducted, compared to a case where the measured length value is acquired by displacing each of the measurement points in the same direction with the recent measurement point, a case where the measured length value is acquired by displacing the measurement points in the reverse order causes a greater repeat error. For example, measurement is conducted in order from a measurement point $X_1$ to a measurement point $X_{Ka}$, and the measurement is conducted in order from the measurement point $X_{Ka}$ to the measurement point $X_1$ in the repeated measurement, the difference (repeat error) between the measured length value during the repeated measurement and the recent measured length value at $X_1$ is increased when temperature drift occurs. Therefore, the determination whether to conduct a measurement again for each measurement point, that is, the determination whether the error is included in the measured length value due to displacement of the rotation center M can be appropriately made, and a highly accurate spatial accuracy correction can be performed.

In the spatial accuracy correction method according to the present invention, before conducting the measurement step, preferably, a preliminary measurement step is included, in which a plurality of the repeated measurements are conducted for the plurality of measurement points and the threshold value is calculated based on the standard deviation of the error by the repeated measurement of the plurality of measurement points in the preliminary measurement step. In the present invention, the preliminary measurement step is conducted prior to the main measurement and the measured length value for each measurement point is measured repeatedly. Then, the threshold value is defined based on the standard deviation of the repeat error by the repeated measurement (for example, a value which is three times the standard deviation is set as a threshold value). In such a case, compared to a case where a predetermined threshold value is used, it is possible to set the most appropriate threshold value in accordance with measurement environment.

The spatial accuracy correction method according to the present invention is a method that includes a positioning mechanism displacing a displacement body to a predetermined set of spatial coordinates, the positioning mechanism also having a retroreflector mounted to the displacement body and allows measurement of measured value of spatial coordinates of the retroreflector; a laser interferometer having the reference point and measuring a measured length value that is a distance from the reference point to the retroreflector; and a control device that is connected to the positioning mechanism and the laser interferometer. The control device displaces the retroreflector to the plurality of measurement points in order and acquires the measured length value and measured value being measured at each of the measurement points. After measuring the measured length value and measured value with respect to each of the plurality of measurement points, at least one or more repeated measurement is conducted for at least one of the plurality of measurement points being measured and when the error in the measurement length value from the repeated measurement with respect to the measurement points being measured repeatedly is equal to or greater than the predetermined threshold value, the plurality of measurement points are measured again. In the present invention, similar to those of the above-described inventions, when the repeat error is equal to or greater than the threshold value, measurement is conducted again for the plurality of measurement points. Accordingly, an appropriate measured length value can be acquired with respect to the each measured point and high accurate correction parameter can be calculated.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
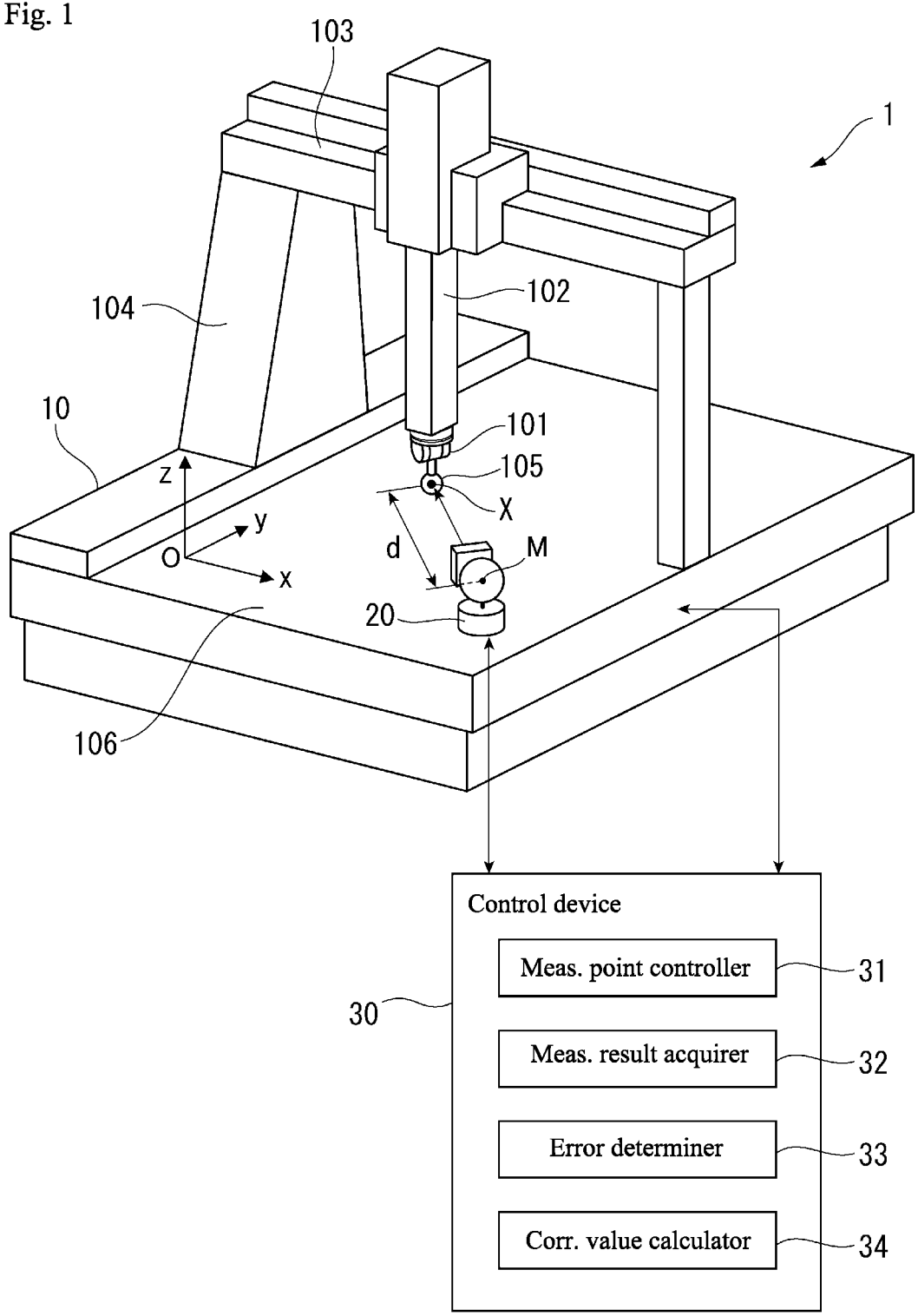
FIG. 1 illustrates a schematic configuration of a spatial accuracy correction apparatus according to a first embodiment.
Figure 7:
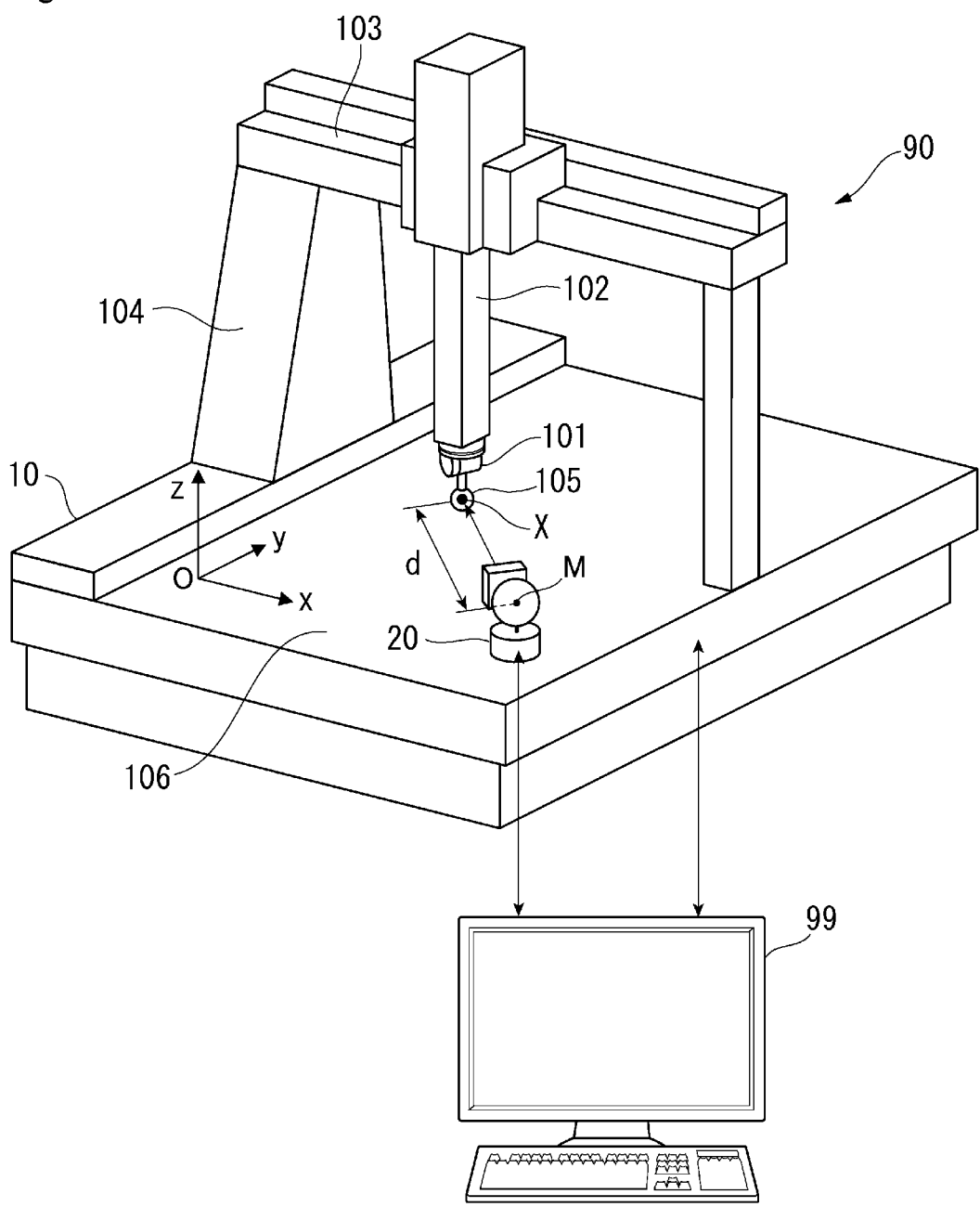
FIG. 7 illustrates a schematic configuration of a conventional spatial accuracy correction apparatus.

Hereafter, a spatial accuracy correction apparatus according to an embodiment of the present invention is described. FIG. 1 illustrates a schematic configuration of a spatial accuracy correction apparatus 1 according to the embodiment. The spatial accuracy correction apparatus 1 includes a CMM 10, a tracking-type laser interferometer 20, and a control device 30. In FIG. 1, the CMM 10 and the tracking-type laser interferometer 20 have the same configuration as the conventional example illustrated in FIG. 7. Specifically, the CMM 10 is equivalent to a positioning mechanism or machine in the present disclosure, and includes a measurement probe 101, a Z spindle 102 to which the measurement probe 101 is affixed, an X guide 103 holding the Z spindle 102 so as to be capable of displacement in an X direction, and a column 104 to which the X guide 103 is affixed and which is capable of displacement in a Y direction. In addition, the CMM 10 includes a Y displacement mechanism, an X displacement mechanism, a Z displacement mechanism, and various scales, none of which are shown in the drawings. The CMM 10 also positions the measurement probe 101 (displacement body or displacer) by displacing the measurement probe 101 to a position having predetermined spatial coordinates, and measures the spatial coordinates of the positioned measurement probe 101 as a measured value $X_{CMM}$. In the present embodiment, by controlling the Y displacement mechanism, X displacement mechanism, and Z displacement mechanism, the measurement probe 101 and the Z spindle 102 to which the measurement probe 101 is affixed are displaced in XYZ directions, configuring the displacement body of the present invention. Moreover, a retroreflector 105 that reflects laser light from the tracking-type laser interferometer 20 is mounted at a tip position of the measurement probe 101 configuring the displacement body. The measurement probe 101 may also be detached and the retroreflector 105 mounted to a tip position of the Z spindle 102.

The tracking-type laser interferometer 20 is equivalent to a laser interferometer in the present invention, and is installed within a measurement range of the CMM 10 (a table 106 or the like on which a measured object is placed, for example) or in the vicinity thereof. Although not shown in the drawings, the tracking-type laser interferometer 20 includes, for example, a laser light source that emits laser light, a light separator that separates the laser light into measurement light and reference light, a light receiver receiving interfering light that is a composite of the reference light and laser light reflected by the retroreflector 105 (return light), and a two-axis rotation mechanism that controls an emission direction of the measurement light (laser light). In addition, the tracking-type laser interferometer 20 tracks the retroreflector 105 by controlling the two-axis rotation mechanism, such that an optical axis of the return light reflected by the retroreflector 105 coincides with an optical axis of the emitted light. More specifically, the two-axis rotation mechanism includes a horizontal rotation mechanism that rotates the emission direction of the laser centered around a perpendicular axis that is parallel to a Z axis and sweeps the emission direction of the laser in a horizontal direction, and a Z rotation mechanism that causes rotation centered around a horizontal axis that is orthogonal to the perpendicular axis and sweeps the emission direction of the laser in the Z direction. Also, a point of intersection between the perpendicular axis and the horizontal axis is a rotation center M of the tracking-type laser interferometer 20, and serves as a reference point in the present invention. The tracking-type laser interferometer 20 uses the interference between the reference light and the return light from the retroreflector 105 to measure a distance from the rotation center M of the two-axis rotation mechanism to the retroreflector 105. The distance measured by the tracking-type laser interferometer 20 is designated as a measured length value d.

The control device 30 is connected to both the CMM 10 and the tracking-type laser interferometer 20. Also, the control device 30 controls the CMM 10 and the tracking-type laser interferometer 20, acquires the measured value $X_{CMM}$ for the position of the retroreflector 105 from the CMM 10 and the measured length value d from the tracking-type laser interferometer 20, respectively, and performs a spatial accuracy correction process of the CMM 10.

Specifically, the control device 30 is configured by a computer such as a personal computer, and includes, for example, storage configured by a memory or the like and a calculator configured by a CPU (Central Processing Unit) or the like. Also, as shown in FIG. 1, the calculator retrieves and executes a program stored in the storage, and the controller 30 thereby carries out operations as a measurement point controller 31, a measurement result acquirer 32, an error determiner 33, a correction value calculator 34, and the like.

The measurement point controller 31 displaces the retroreflector 105 to a predetermined measurement point X. In the present embodiment, a plurality of measurement points at which measurement is conducted and a measurement order for the measurement points are defined ahead of time. In this example, in the present embodiment, the plurality of measurement points are divided into a plurality of measurement lines that include a predetermined number Ka of measurement points, and the measurement point controller 31 measures each of the measurement points belonging to the measurement line in order, then measures again (repeated measurement) at least one of the measurement points belonging to the measurement line.

The measurement result acquirer 32 acquires the measurement results for each measurement point. In other words, the measurement result acquirer 32, for example, synchronizes the CMM 10 and the tracking-type laser interferometer 20, and causes the measured value $X_{CMM}$ and the measured length value d for the measurement point X to be measured simultaneously. The measurement probe 101 may also be stopped at the measurement point X by the measurement point controller 31 and the measured value $X_{CMM}$ and the measured length value d may be measured at substantially the same time.

The error determiner 33 calculates, with respect to the measurement point repeatedly measured, a difference (repeat error $\Delta d_{C1}$) between the measured length value d measured repeatedly and the measured length value d initially measured (before the repeated measurement) and determines whether the repeat error $\Delta d_{C1}$ exceeds a threshold value S. The correction value calculator 34 calculates a correction parameter $B\alpha$ based on the measured value $X_{CMM}$ and the measured length value d acquired by the measurement result acquirer 32. Detailed processes of the measurement point controller 31, the measurement result acquirer 32, the error determiner 33, and the correction value calculator 34 are described later.

Spatial Accuracy Correction Method

Hereafter, a spatial accuracy correction method (spatial accuracy correction process) performed by the spatial accuracy correction apparatus 1 is described in which a correction parameter for correcting the spatial coordinates of the CMM 10 is calculated. In the spatial accuracy correction process according to the present embodiment, the position of the rotation center M of the tracking-type laser interferometer 20 (installation position of the tracking-type laser interferometer 20) and a stylus offset (relative position of the retroreflector 105 with respect to the Z spindle) are modified and the measured values $X_{CMM}$ and measured length values d for the plurality of measurement points X are acquired, and the correction parameter $B\alpha$ is calculated. In this example, the present embodiment is described as having a variable that indicates the stylus offset designated n (where n is an integer from 1 to $n_{max}$ and an initial value is n=1) and a variable that indicates the position of the rotation center M of the tracking-type laser interferometer 20 designated m (where m is an integer from 1 to $m_{max}$ and an initial value is m=1).

Figure 2:
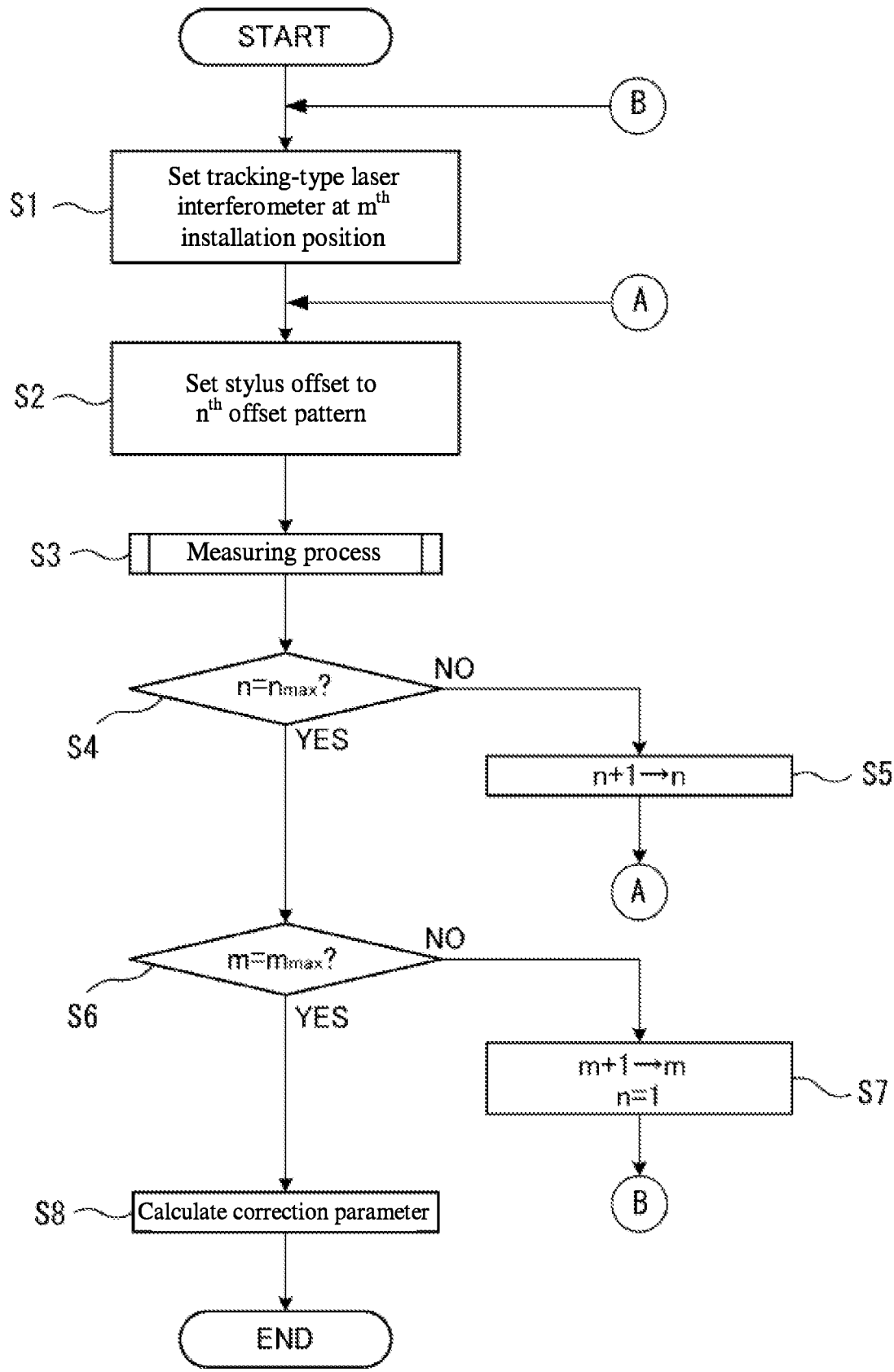
FIG. 2 is a flow chart illustrating a spatial accuracy correction method according to the first embodiment.

FIG. 2 is a flow chart illustrating the spatial accuracy correction process (spatial accuracy correction method) according to the present embodiment. In the spatial accuracy correction process according to the present embodiment, first, the position of the rotation center M of the tracking-type laser interferometer 20 is set to an $m^{th}$ installation position (step S1). The stylus offset (position of retroreflector 105) is set to a position of an $n^{th}$ offset pattern (step S2). In steps S1 and S2, an operator may, for example, manually modify the mount position of the retroreflector 105 and the installation position of the tracking-type laser interferometer 20, or the mount position of the retroreflector 105 and the installation position of the tracking-type laser interferometer 20 may be modified automatically. For example, a motorized probe that is capable of modifying an orientation of the stylus using electric drive may be used as the measurement probe 101, and the relative position of the retroreflector 105 with respect to the Z spindle 102 may be displaced through control executed by the control device 30. In addition, the tracking-type laser interferometer 20 may be held by a movable arm that is capable of displacing with respect to the XYZ directions, and the installation position of the tracking-type laser interferometer 20 may be set to a predetermined position by controlling the movable arm through control executed by the control device 30. After this, the control device 30 conducts a measurement process (measurement step) of the measured values $X_{CMM}$ and the measured length values d for the plurality of measurement points X (step S3).

Figure 3:
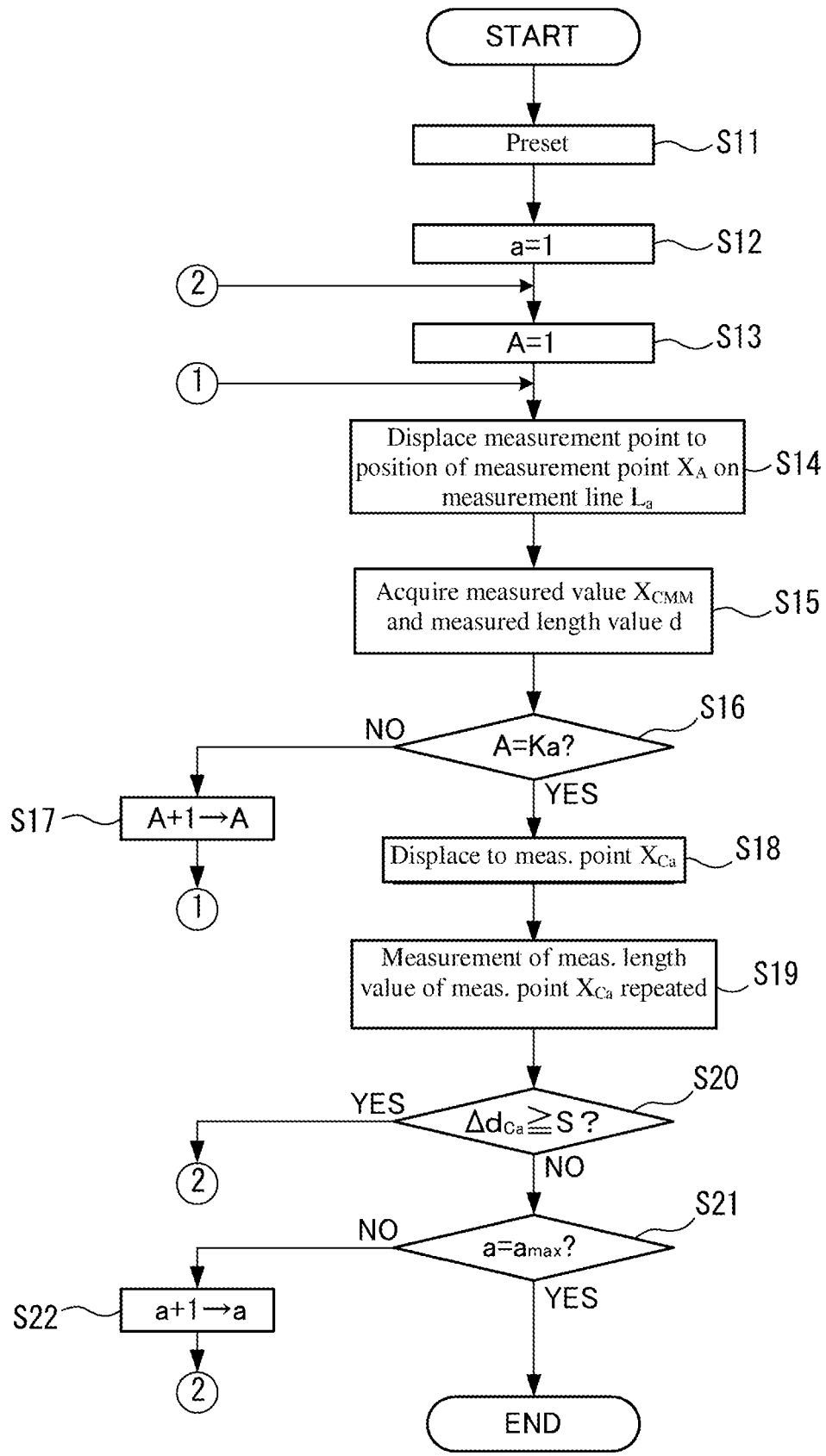
FIG. 3 is a flow chart illustrating a measuring process of the first embodiment.

FIG. 3 is a flow chart illustrating a measuring process for the measured values $X_{CMM}$ and the measured length values d of the plurality of measurement points X according to the present embodiment. In the measuring process of step S3, similar to a conventional spatial accuracy correction process, first presetting is performed in which the position of the rotation center M of the tracking-type laser interferometer 20 and an absolute distance from the rotation center M to the retroreflector 105 are defined (step S11). In step S11, as in the specification of German Patent No. 102007004934 and Umetsu et al. (2005), for example, a multilateration method is used to calculate the coordinates of the rotation center M and the absolute distance from the rotation center M to the retroreflector 105, and presetting is performed such that the measured length value d acquired by the tracking-type laser interferometer 20 equals the absolute distance from the rotation center M to the retroreflector 105.

Next, the control device 30 controls the CMM 10, displaces the retroreflector 105 to the plurality of measurement points X, and conducts a measurement with the CMM 10 and a length measurement with the tracking-type laser interferometer 20 for each of the measurement points X. For these measurements, the control device 30 first sets a variable a that indicates the measurement line to an initial value (a=1) (step S12), then sets a variable A that indicates the measurement point X belonging to each measurement line to an initial value (A=1) (step S13). The variable a is an integer from 1 to $a_{max}$, and "measurement line $L_a$" indicates an $a^{th}$ measurement line L. Furthermore, the variable A is an integer from 1 to Ka, and a measurement point $X_A$ indicates a measurement point X that is measured $A^{th}$ on the measurement line. The number Ka of measurement points X included in the measurement line L may be a different value for each measurement line L, or may be the same value for each.

Also, the measurement point controller 31 controls the CMM 10 and displaces the retroreflector 105 to a measurement point $X_A$ on a measurement line $L_a$ (step S14). The measurement result acquirer 32 measures the measurement point $X_A$ on the measurement line $L_a$ with the CMM 10 and the tracking-type laser interferometer 20, and acquires the measured value $X_{CMM}$ measured by the CMM 10 and the measured length value d measured by the tracking-type laser interferometer 20, respectively (step S15). In step S15, the CMM 10 and the tracking-type laser interferometer 20 may be synchronized and the measured value $X_{CMM}$ and the measured length value d may be acquired simultaneously; the retroreflector 105 may also be stopped at a position corresponding to the measurement point $X_A$ and the measurement by the CMM 10 and the measurement by the tracking-type laser interferometer 20 may be carried out in order.

After this, the measurement point controller 31 determines whether the variable A equals Ka (step S16). Specifically, the measurement point controller 31 determines whether measurement for all (for Ka) of the measurement points X belonging to the measurement line $L_a$ has ended. When the measurement point controller 31 reaches a "No" determination in step S16, 1 is added to the variable A (step S17) and the process returns to step S14. That is, measurement points X at Ka points from A=1 to A=Ka belonging to the measurement line $L_a$ are measured in succession. For example, in the example of FIG. 4, a number K1 of measurement points X belong to the measurement line $L_1$ and the measured value $X_{CMM}$ and measured length value d are measured in order from a measurement point $X_1$, measurement point $X_2$, measurement point $X_3$, ... measurement point $X_{K1-1}$, and a measurement point $X_{K1}$.

Figure 4:
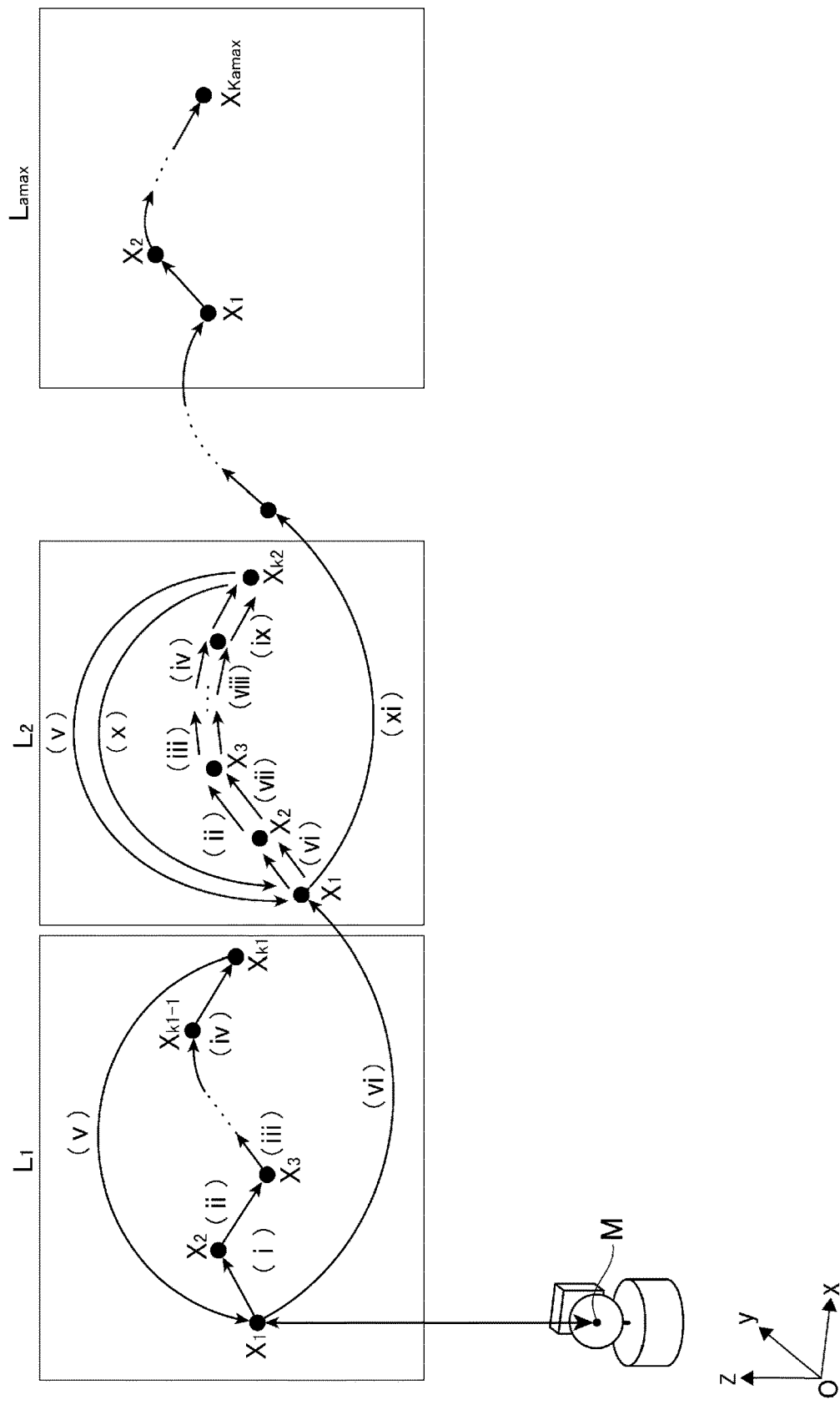
FIG. 4 illustrates an exemplary measurement order of measurement points according to the first embodiment.

On the other hand, when the measurement point controller 31 reaches a "Yes" determination in step S16, the measurement point controller 31 displaces the retroreflector 105 to a predetermined measurement point $X_{Ca}$ on the measurement line $L_a$ (step S18). Then, the measurement result acquirer 32 conducts the repeated measurement at the measurement point $X_{Ca}$ by the tracking-type laser interferometer 20 (step S19). In the present embodiment, the measurement point $X_{Ca}$ to be measured for repeated measurement is the measurement point $X_1$. In other words, on the measurement line $L_a$, the measurement point controller 31 displaces the retroreflector 105 to a position of the measurement point $X_1$ that has been initially measured and conducts measurement on the measurement point $X_1$ by the tracking-type laser interferometer 20. Accordingly, as shown in FIG. 4, when measurement of the measurement point $X_{K1}$ on the measurement line $L_1$ is ended, not the measurement of the measurement point $X_1$ on a measurement line $L_2$, but the measurement of the measured length value d with respect to the measurement point $X_1$ on the measurement line $L_1$ is repeated. The number of measurements of the repeated measurement in step S19 may be once or may be two times or more. Even when the measurement is conducted once in step S19, the measurement with respect to the measurement point $X_{Ca}$ is conducted two times in total by measurements in steps S15 and S19.

Next, the error determiner 33 determines, based on the measurement results of the repeated measurement in step S19, whether a repeat error Δd is equal to or greater than a predetermined threshold value S (step S20). Specifically, the error determiner 33 extracts the largest measured value $d_{max\_Ca}$ and the smallest measured value $d_{min\_Ca}$ from the measured length value d acquired by measurement in step S15 and at least one or more measured length values d acquired by the repeated measurement in step S19. Then, the error determiner 33 determines whether a repeat error $\Delta d_{Ca}$ (=$d_{max\_Ca}$−$d_{min\_Ca}$) is equal to or greater than the predetermined threshold value S.

When the error determiner 33 reaches a "Yes" determination ($\Delta d_{Ca} \geq S$) in step S20, and the process returns to step S13. In other words, the measurement point controller 31 controls the CMM 10 and displaces the retroreflector 105 to the initial measurement point $X_1$ on the measurement line La, and measures again the measured value $X_{CMM}$ and measured length value d from measurement points $X_1$ to $X_{Ka}$. Thus, measurement of each measurement point X belonging to the measurement line $L_a$ is repeated until it is determined as $\Delta d_{Ca} < S$ in step S20.

Meanwhile, when the measurement point controller 31 reaches a "No" determination ($\Delta d_{Ca} < S$) in step S20, the measurement point controller 31 determines whether the variable a equals $a_{max}$ (step S21). When the measurement point controller 31 reaches a "No" determination in step S21, 1 is added to the variable a (step S22) and the process returns to step S13. Specifically, each measurement point X belonging to the next measurement line $L_a$ are measured until the repeat error $\Delta d_{Ca}$ is less than the threshold value S.

In an example shown in FIG. 4, measurements are conducted with respect to the measurement line $L_1$ for the measured values $X_{CMM}$ and measured length values d from the measurement points $X_1$ to $X_{K1}$ in order from (i) to (iv) by the measurements in step S13 to step S17. Then, as shown by (v) in FIG. 4, the repeated measurement is conducted by returning to the measurement point $X_1$. In the example shown in FIG. 4, the calculated repeat error $\Delta d_{C1}$ with respect to the measurement line $L_1$ is less than the threshold value S. In such a case, as shown in FIG. 4, after conducting the repeated measurement of the measurement point $X_1$, without conducting measurement of the measurement points $X_1$ to $X_{K1}$ again, a measured object is moved to the initial measurement point $X_1$ on the measurement line $L_2$ as shown by (vi) and the measurement for each measurement point X belonging to the measurement line $L_2$ begins.

Also, similar to the measurement line $L_1$, measurements are also conducted with respect to the measurement line $L_2$ for the measured values $X_{CMM}$ and measured length values d from the measurement points $X_1$ to $X_{K2}$ in order from (i) to (iv) by the measurements in step S13 to step S17, after which the repeated measurement is conducted after returning to the measurement point $X_1$ shown by (v). In the example shown in FIG. 4, a calculated repeat error $\Delta d_{C2}$ with respect to the measurement line $L_1$ is equal to or greater than the threshold value S. In such a case, as shown by (vi) to (ix) in FIG. 4, after measurement of the measurement point $X_1$ is repeated, the measurements in step S13 to S17 are conducted again and the measured value $X_{CMM}$ and measured length value d for each measurement point X from the measurement points $X_1$ to $X_{K2}$ are measured again. Further, as shown by (x), the repeat measurement of the measurement $X_1$ and determination of the repeat error $\Delta d_{C2}$ are performed again. When the repeat error $\Delta d_{C2}$ is determined to be less than the threshold value S, the process advances to the next measurement line $L_3$ as shown by (xi).

Then, when the measurement point controller 31 reaches a "Yes" determination in step S21, and the measured values $X_{CMM}$ and measured length values d for all of the measurement points X in all of the measurement lines L have been measured, the measurement process is ended for a case where the stylus offset is an nth offset pattern and the set position of the tracking-type laser interferometer 20 is an $m^{th}$ position.

After this, the control device 30 determines whether the variable n equals $n_{max}$ (step S4), and when the control device 30 reaches a "No" determination, 1 is added to the variable n (step S5) and the process returns to step S2. In addition, when a "Yes" determination is made in step S4, the control device determines whether the variable m equals $m_{max}$ (step S6). When a "No" determination is made, 1 is added to the variable m and the variable n is set to the initial value of 1 (step S7) and the process returns to step S1. Then, in step S6, when a "Yes" determination is reached, the correction value calculator 34 uses the measured value $X_{CMM}$ and the measured length value d and calculates a correction parameter (step S8: parameter calculation step). In step S8, similar to a conventional spatial accuracy correction method, the control device 30 applies the several thousand measured values $X_{CMM}$ ($x_{CMM}$, $y_{CMM}$, $z_{CMM}$) and measured length values d measured by the measuring process of step S3 into Expressions (1) and (2), which is given below, and simultaneous equations for several thousand Expressions (1) and (2) are generated.

[Formula 2]

$$\delta p \equiv [\delta x \quad \delta y \quad \delta z]^T = HB\alpha \quad (1)$$

$$\sqrt{\{(x_{CMM} + \delta x) - (x_m + f_{xm})\}^2 + \{(y_{CMM} + \delta y) - (y_m + f_{ym})\}^2 + \{(z_{CMM} + \delta z) - (z_m + f_{zm})\}^2} = (d + F_d) \quad (2)$$

In Expression (1), $\delta p \equiv (\delta x, \delta y, \delta z)^T$ is a matrix of an error in the measured values $X_{CMM}$ acquired by the CMM 10 at each measurement point X, and specifically is an error between the actual position of the retroreflector 105 and the measured value $X_{CMM}$. The superscript character "T" represents a transposed matrix. In addition, $B\alpha$ is a matrix of correction parameters for the CMM 10 expressed by a B-spline function, B is a matrix of basis functions of B-spline functions, and $\alpha$ is a matrix of coefficients for the basis functions. H is a matrix converting the correction parameter $B\alpha$ to an error $\delta p$ of the CMM 10, and is configured from a mechanical structure and stylus offset information of the CMM 10 to be corrected. In this example, the mechanical structure information for the CMM 10 is a value predetermined by individual CMM 10 and the stylus offset information is a value predetermined by an offset pattern with respect to the variable n set during measurement. Also, the left and right sides of Expression (2) express, respectively, the measured value $X_{CMM}$ for the CMM 10 and the distance from the rotation center M to the retroreflector 105, which is expressed by the measured length value d of the tracking-type laser interferometer. And $x_m$, $y_m$, and $z_m$ are respectively x, y, and z components of the coordinates of the rotation center M measured in the presetting. The first correction constant $F_d$ is a correction constant for the preset value of the measured length value d. And $f_{xm}$, $f_{ym}$, and $f_{zm}$ are respectively x, y, and z components of the second correction constant $F_M$. The second correction constant $F_M$ is a correction constant for the coordinate of the rotation center M. The first correction constant $F_d$ and the second correction constant $F_M$ are both unknown quantities, and a different correction constant is applied each time the position of the rotation center M is changed and each time the stylus offset is changed. These correction constants can be found, together with the correction parameter $B\alpha$, when solving the simultaneous equations of Expressions (1) and (2). Therefore, the correction value calculator 34 allows the correction parameter $B\alpha$ of the CMM 10 to be found by solving the simultaneous equations using the least square method, for example.

Advantage of Present Embodiment

The spatial accuracy correction apparatus 1 according to the present embodiment includes a CMM 10 which is a positioning mechanism; a tracking-type laser interferometer 20 installed within a measurement range of the CMM 10, or in the vicinity thereof; and a control device 30 connected so as to be capable of communication with the CMM 10 and the tracking-type laser interferometer 20. In the spatial accuracy correction process in which the spatial coordinates of the CMM 10 is corrected, the control device 30 conducts the measurement step (measurement process) of the measured values $X_{CMM}$ by the CMM 10 at each measurement point X and the measured length values d by the tracking-type laser interferometer 20 by displacing the retroreflector 105 to the plurality of measurement points X in order, the retroreflector 105 being provided at a tip position of the measurement probe 101 of the CMM 10. At this time, the control device 30 divides the plurality of measurement points X into a plurality of measurement lines $L_a$ (a=1~$a_{max}$). After the measurement with respect to each measurement point X belonging to the measurement line $L_a$ is ended, the repeated measurement is conducted for the measured length value d of the predetermined measurement point $X_{Ca}$ among the measurement points X belonging to the measurement line $L_a$. Then, a determination is made whether the repeat error $\Delta d_{Ca}$ is equal to greater than the threshold value S when the repeated measurement is conducted for the measurement $X_{Ca}$. When the repeat error is equal to or greater than the threshold value S, the measured value $X_{CMM}$ and the measured length value d of each measurement point X belonging to the measurement line $L_a$ are measured again. Accordingly, $\Delta d_{Ca} \geq S$ is realized when the position of the tracking-type laser interferometer 20 is displaced due to temperature drift or an external impact, and therefore, measurement of each measurement point X is conducted again. Accordingly, appropriate the measured value $X_{CMM}$ and the measured length value d of each measurement point X can be acquired and the correction parameter $B\alpha$ can be calculated accurately in the spatial accuracy correction.

In addition, each time the measurement is ended for the number Ka of measurement points X belonging to the measurement line $L_a$ where the plurality of measurement points are divided, the repeated measurement for the measurement point $X_{Ca}$ belonging to the measurement line $L_a$ is conducted. In such a case, for example, compared to a case where the repeated measurement for the predetermined measurement point X is conducted after the measurement of all measurement points X is conducted without setting the measurement line $L_a$, appropriate measured value and measured length value with respect to each measurement point X can be acquired rapidly.

In the present embodiment, of the measurement points X belonging to the measurement line $L_a$, the measurement point $X_1$ being measured first on the measurement line $L_a$ is the measurement $X_{Ca}$ where the repeated measurement is conducted. In steps S14 and S15, the tracking-type laser interferometer 20 may be displaced due to temperature drift or the external impact in the middle of measuring, in order, the measured value $X_{CMM}$ and measured length value d of each measurement point X of the measurement line $L_a$. In such a case, the repeated measurement of the measurement point $X_1$ initially measured always includes the repeat error due to positional offset. Therefore, by conducting repeated measurement of the measurement point $X_1$, the determination can be made rapidly and readily whether the position of the tracking-type laser interferometer 20 is displaced due to temperature drift or the external impact.

Second Embodiment

Next, a second embodiment is described. In the following description, portions identical to those which have been previously described are assigned identical reference numerals and a description thereof is omitted or simplified. According to the first embodiment described above, in the parameter calculation step in step S8, values of the measured value $X_{CMM}$ and measured length value d acquired in step S3 are substituted into Expressions (1) and (2) and calculated the correction parameter by using the least square method. At this time, different correction constants were applied to the first correction constant $F_d$ (correction constant of the measured length value d) and the second correction constant $F_M$ (correction constant of the coordinates of the rotation center M) when the position of the rotation center M is changed and when the stylus offset is changed. In contrast, in a second embodiment, when the position of the rotation center M is changed in addition to when the stylus offset is changed, as well as when the measurement line $L_a$ is changed, different correction constants are applied to the first correction constant $F_d$ and the second correction constant $F_M$ respectively to calculate the correction parameter, which differs from the first embodiment.

In other words, the first embodiment enables detection of the offset in the position of the rotation center M generated during a period from the timing of initial measurement in step S15 until the repeated measurement is conducted in step S19. However, for example, in a case where the offset in the position of the rotation center M increases (or decreases) over the measurement of the plurality of measurement lines $L_a$, measurement accuracy is reduced. Given this, in the second embodiment, a second correction constant $F_{Ma}$ is applied to the position of the rotation center M for each measurement line $L_a$. In Addition, for each measurement line $L_a$, a first correction constant $F_{da}$ is applied to the measurement length value d of each measurement point X belonging to the measurement line $L_a$. The first correction constant $F_{da}$ and the second correction constant $F_{Ma}$ are set with respectively different values (constant) for each measurement line $L_a$.

After conducting the similar measurement as in the first embodiment, the correction value calculator 34 substitutes the several thousand measured values $X_{CMM}$ ($x_{CMM}$, $y_{CMM}$, $z_{CMM}$) and measured length values d into Expression (1) and Expression (3), which is given below, and simultaneous equations for several thousand Expressions (1) and (3) are generated. However, $f_{xma}$, $f_{yma}$, and $f_{zma}$ are respectively x, y, and z components of the second correction constant $F_{Ma}$.

[Formula 3]

$$\sqrt{\{(x_{CMM}+\delta x)-(x_m+f_{xma})\}^2+\{(y_{CMM}+\delta y)-(y_m+f_{yma})\}^2+\{(z_{CMM}+\delta z)-(z_m+f_{zma})\}^2} = (d+F_{da}) \quad (3)$$

Therefore, the correction value calculator 34 calculates the correction parameter $B\alpha$ by solving the simultaneous equations for Expressions (1) and (3) above using the least square method. At this time, an optimal solution for the first correction constant $F_{da}$ and the second correction constant $F_{Ma}$ are also calculated simultaneously.

In the present embodiment noted above, even when the position of the tracking-type laser interferometer 20 becomes offset due to a temperature drift or the like over measurement of the plurality of measurement lines, by applying the correction constants $F_{Ma}$ and $F_{da}$ which are respectively different to each measurement line $L_a$, the effects of the offset can be inhibited and highly accurate correction parameter can be calculated.

Third Embodiment

Next, a third embodiment is described. In the first embodiment described above, the measurement point $X_{Ca}$ for the repeated measurement in step S19 is the initial measurement point $X_1$ on the measurement line $L_a$. In contrast, the third embodiment differs from the above-described first embodiment in that the plurality of measurement points X belonging to the measurement lines $L_a$ are measured as the measurement point $X_{Ca}$.

Figure 5:
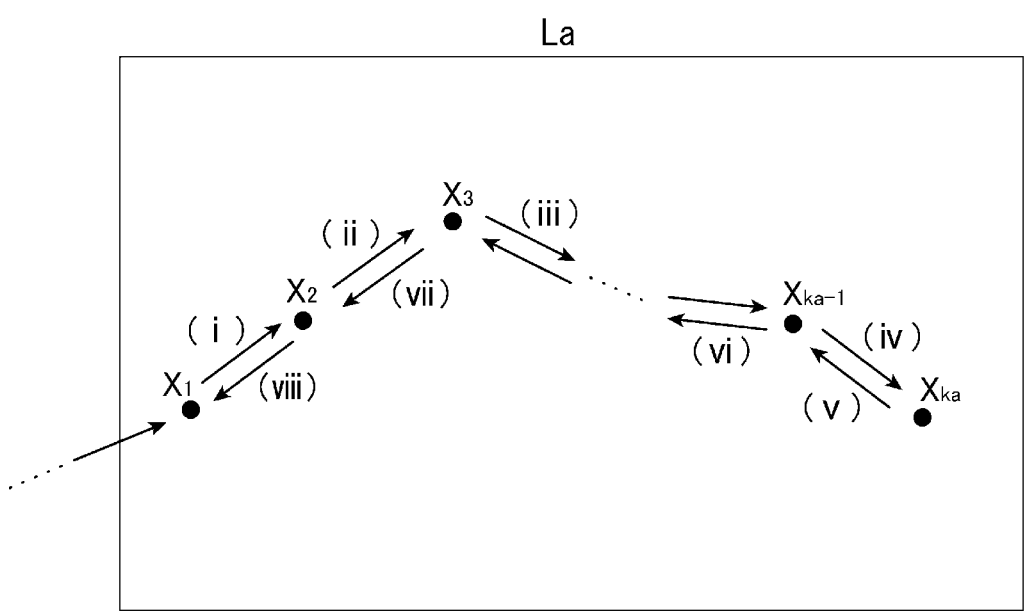
FIG. 5 illustrates an exemplary measurement order of measurement points according to a third embodiment.

FIG. 5 illustrates an exemplary measurement order of measurement points according to the third embodiment. Specifically, in the present embodiment, the measurement point $X_{Ca}$ for the repeated measurement is all the measurement points X included in the measurement lines $L_a$ and the measurement is conducted in a reverse direction from the recent measurement direction of the measurement points. In the example shown in FIG. 5, a number Ka of measurement points X belong to the measurement line $L_a$, for example. In such a case, in step S15, in order from the measurements points $X_1, X_2, X_3 \ldots$ to $X_{Ka}$, that is, in order from (i), (ii), (iii) . . . to (iv) as illustrated by arrows shown in FIG. 5, the measurement is conducted for the number of Ka of measurement points X. On the other hand, in the repeated measurement in step S19, the measurement is conducted in a reverse direction from the measurement order in step S15 (measurement points from $X_{Ka}, X_{Ka-1}, X_{Ka-3} \ldots$ to $X_1$), that is, in order from (v), (vi) . . . to (vii), (viii) as illustrated by arrows in FIG. 5. When the repeated measurement is conducted a plurality of number of times, measurements are conducted alternately in the reverse direction and forward direction. The error determiner 33 calculates the repeat error $\Delta d_{Ca}$ with respect to each of the plurality of measurement points $X_{Ca}$ (in the present embodiment, all measurement points X belonging to the measurement line $L_a$) and the measurement is conducted again when there is at least one repeat error $\Delta d_{Ca}$ being equal to or greater than the threshold value S.

In this way, of the measurement points X belonging to the measurement line $L_a$, by making the plurality of measurement points X for the repeated measurement, the offset in position of the tracking-type laser interferometer 20 can be accurately determined. Further, during the repeated measurement, by measuring each measurement point in order of the reverse direction from the recent measurement order, an influence of temperature drift can be inhibited effectively. In other words, in a case where temperature drift is generated during the repeated measurement and the measurement of the plurality of measurement points X, an error may incorporated into the measured value acquired by the repeated measurement at each measurement point X as well. In contrast, when the measurements of each measurement point X are conducted alternately between in the forward direction and the reverse direction, for example, it is possible to substantially cancel the influence of temperature drift and to acquire the measured length value close to when there is no temperature drift by calculating least square values thereof. While even in such a case, some offset error remains, however, by applying the correction constants $F_{Ma}$ and $F_{da}$ for each measurement line $L_a$ as in the second embodiment noted above, the offset error can be reduced.

Fourth Embodiment

In the first embodiment noted above, the error determiner 33 uses the predetermined threshold value S to determine whether the repeat error $\Delta d_{Ca}$ is $\Delta d_{Ca} \geq S$. In contrast, the present embodiment differs from the first embodiment in that the threshold value S is changed in accordance with results of the preliminary measurement.

Figure 6:
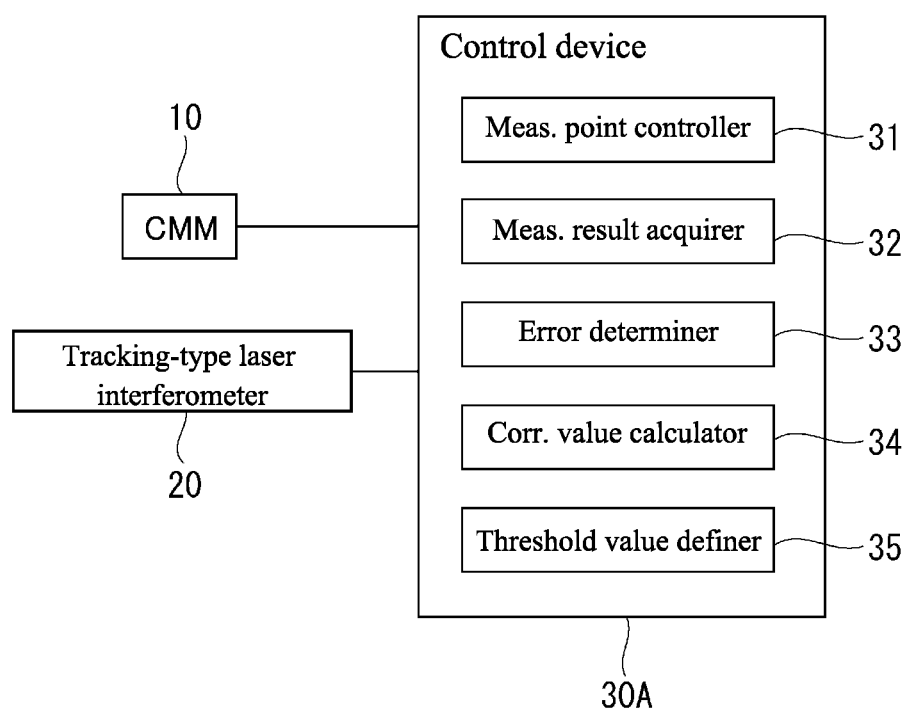
FIG. 6 illustrates a schematic view of a configuration of functions of a control device according to a fourth embodiment.

FIG. 6 illustrates a schematic view of a configuration of functions of the control device according to a fourth embodiment. A control device 30A of the present embodiment, similar to the first embodiment, serves as the measurement point controller 31, the measurement result acquirer 32, the error determiner 33, the correction value calculator 34, and further serves as a threshold value definer 35. The threshold value definer 35 defines the threshold value S based on the measurement results when the preliminary measurement of the measured length value d for each measurement point X is conducted.

Specifically, in the present embodiment, in the measurement process in step S3, after the presetting in step S11, the preliminary measurement is conducted before measuring ("the main measurement" of the measured value $X_{CMM}$ and the measured length value d with respect to each measurement point X. In the preliminary measurement, the retroreflector 105 is displaced in order of each measurement point $X$ ($X_1$ to $X_{Ka}$) belonging to the arbitrary measurement line $L_a$ and measures the measured length value d for each measurement point X, and further, the repeated measurement of each measurement point X of the measurement line $L_a$ is conducted again. After this, the threshold value definer 35 calculates the repeat error $\Delta d$ with respect to each measurement point X and defines a value which is three times a standard deviation of the repeat error $\Delta d$ as the threshold value S.

In the above, an example of defining the threshold value S is described by the preliminary measurement of the arbitrary one measurement line $L_a$ (such as an initial measurement line $L_1$). However, the measurement may be conducted for the plurality of measurement lines $L_a$ and the repeated measurement of each measurement point X of all the measurement lines $L_a$ ($a=1 \sim a_{max}$) may be conducted. In such a case, the threshold value S of the measurement line $L_1$ may be defined based on the result of the preliminary measurement of the measurement line $L_1$ and a different threshold value S may be defined for each measurement line. Further, in the preliminary measurement noted above, an example is described where the initial measurement and one time repeated measurement are conducted for each measurement point X (two measured length values d are acquired). However, by conducting more repeated measurements, the threshold value S may be defined based on the repeat error $\Delta d_{Ca}$ calculated from at least three or more measured length values d.

In the present embodiment, the following effects and advantages can be achieved. In other words, when the predetermined value is used as the threshold value S, for example, the threshold value S may be too small or too large for operation environments or individual differences of the CMM 10 or the tracking-type laser interferometer 20. When the threshold value S is too small, there is a case where the repeat error $\Delta d_{Ca}$ does not become equal to or less than the threshold value S even after repeating the a plurality of processes from step S12 to step S20. In such a case, the longer time is required for the spatial accuracy correction process. On the other hand, when the threshold value S is too large, the error included in the measured length value d is greater and the highly accurate spatial accuracy correction process becomes difficult. In response, in the present embodiment, the preliminary measurement of each measurement point X is conducted and based on the result of the preliminary measurement, the threshold value determiner 35 can define the most appropriate threshold value S in accordance with the operation environments or the individual differences of the CMM 10 or the tracking-type laser interferometer 20. Therefore, unfavorable situation where the redetermined threshold value S is used as noted above can be improved and the spatial accuracy correction process can be performed rapidly and with a high degree of accuracy.

Modification

Moreover, the present invention is not limited to the embodiment described above, but may include modifications within a scope not departing from the object of the present invention. For example, in the first to fourth embodiments, the CMM 10 is given as an example of a positioning mechanism, but the present invention is not limited to this. As noted above, any mechanism that positions a displacement body by displacing the displacement body to a predetermined set of spatial coordinates can be employed as the positioning mechanism. For example, the positioning mechanism may be a machine tool having a processing tool that cuts, polishes, or performs similar work on an object as the displacement body, where the machine tool displaces the processing tool to a predetermined coordinate position. The positioning mechanism may also be a transport robot having a gripping arm that grips an object as the displacement body, where the transport robot transports the gripped object to a predetermined position.

In the embodiments noted above, the plurality of measurement points X are divided into a plurality of measurement lines $L_a$, and each time the measurement of the measurement line $L_a$ is ended, an example is described where the repeated measurement is conducted for at least one measurement points X belonging to the measurement line $L_a$. However, the present invention is not limited to this. For example, each time the measurement of a predetermined number (such as two) of measurement lines $L_a$ is ended, the repeated measurement may be conducted for the measurement points X included in the predetermined number of the measurement lines $L_a$. In addition, after measuring all the measurement points X regardless of the measurement line $L_a$, the repeated measurement of at least one measurement point (for example, the measurement $X_1$ measured for the very first time) among the all measurement points X may be performed.

In the embodiment described above, an example is given in which the number of measurement points X (number Ka of measurement points) belonging to the measurement line $L_a$ is a different value for each measurement line $L_a$, but the number of measurement points X belonging to each measurement line $L_a$ may be an identical number Ka of measurement points.

A method of defining the measurement points X belonging to the measurement line $L_a$ in the embodiment described above may be any method. For example, measurement points having a distance that is within a predetermined value from a preset reference measurement point may be included in a single measurement line $L_a$. In other words, the measurement points X that are positioned close to each other may be included in the same measurement line $L_a$. Also, when the plurality of measurement points are measured in order, the measurement lines $L_a$ may be divided at the measurement points that can be measured within a predetermined amount of time. Specifically, the plurality of measurement points X that are measured within a predetermined first time t from the beginning of the measurement are the measurement points X belonging to the measurement line $L_1$, and the measurement points X that are measured within a second time 2t from the first time t are the measurement points X belonging to the measurement line $L_2$. Also, in such a case, time intervals for the measurement lines $L_a$ are not necessarily constant. For example, the measurement points X that are measured within a first time $t_1$ from the beginning of the measurement may be designated as the measurement points X belonging to the measurement line $L_1$, and the measurement points X that are measured from the first time $t_1$ up to a second time $t_2$ ($t_1 \neq t_2 - t_1$) may be designated as the measurement points X belonging to the measurement line $L_2$.

In the first embodiment, the initial measurement point $X_1$ belonging to the measurement line $L_a$ was for the repeated measurement, however, the object to be measured may be other measurement point X. However, when the repeated measurement is conducted, the repeat error becomes the largest at the measurement point X measured in the first half on the measurement line $L_a$. Therefore, as the measurement point X for the repeated measurement, one of the measurement points $X_A$ between A=1 to A=Ka/2 is preferably included. In addition, in the first embodiment, in addition to the measurement point $X_1$, other measurement point X may be set as the measurement point $X_{Ca}$ for the repeated measurement. For example, in steps S13 to S17, when the measured value $X_{CMM}$ and measured length value d for the each measurement point X are measured in order, the measurement points X that are measured at the odd numbers may be the object for the repeated measurement.

In the second embodiment described above, an example is given where the first correction constant $F_{da}$ is applied to the measured length value d of each measurement point X and the second correction constant $F_{Ma}$ is applied to the coordinates of the rotation center M of the tracking-type laser interferometer 20. However, a correction constant may also be applied to only one of the measured length value d and the rotation center M. For example, when the first correction constant $F_{da}$ is applied to only the measured length value d, in Expression (3) given above, simultaneous equations may be created with $f_{xma}$, $f_{yma}$, and $f_{zma}$ set to 0 to find the correction parameter $B\alpha$.

In the fourth embodiment, the threshold value definer 35 calculates the repeat error $\Delta d$ using the results of the repeated measurement conducted in the preliminary measurement, and defines a value which is three times a standard deviation of the repeat error $\Delta d$ as the threshold value S. However, the present invention is not limited to this. For example, a value which is two times the standard deviation of the repeat error $\Delta d$ may be defined as the threshold value S, and further, the value may be acquired by adding a predetermined value to the standard deviation.

In each of the embodiments described above, the tracking-type laser interferometer 20 having the rotation center M as the reference point is given as an example of a laser interferometer, but the present invention may also employ a laser interferometer that does not have a tracking function. However, each time a measurement point X is displaced, the length measurement direction for measuring the distance with the laser interferometer must be modified. Accordingly, in such a case, preferably, a plurality of measurement points are defined on the length measurement direction of the laser interferometer (on a straight line), and once the retroreflector 105 has been displaced to each measurement point, the measured value $X_{CMM}$ and the measured length value d are measured. In addition, the length measurement direction is preferably changed to a plurality of directions, and the plurality of measurement points X are preferably defined for each length measurement direction.

The present invention can be used for spatial accuracy correction of a positioning mechanism such as a coordinate measuring machine (CMM), machine tool, robot, or the like that positions a displacement body by displacing the displacement body to a predetermined coordinate position.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A spatial accuracy correction method having a positioning mechanism displacing a displacement body to a predetermined set of spatial coordinates, the positioning mechanism also having a retroreflector mounted to the displacement body, and a laser interferometer having a reference point and measuring a distance from the reference point to the retroreflector, the method performing spatial accuracy correction of the positioning mechanism using a measured length value measured by the laser interferometer and a measured value for spatial coordinates of the retroreflector measured by the positioning mechanism, the method comprising:
   a measurement process comprising:
      displacing the retroreflector to a plurality of measurement points in order, and
      acquiring the measured length value and the measured value at each of the measurement points, wherein after measuring the measured length value and the measured value for each of the plurality of measurement points:
         conducting at least one or more repeated measurement for at least one of the plurality of measured measurement points, and
         when an error in the repeated measurement of the measured length value for the measurement point that undergoes the repeated measurement is equal to or greater than a predetermined threshold value, again measuring the plurality of measurement points.

2. The spatial accuracy correction method according to claim 1, wherein the measurement process further comprises:
   dividing a plurality of measurement points into a plurality of measurement lines; and
   after measurement of the measured length value and the measured value of all the measured points belonging to each of the measurement lines is ended, conducting at least one or more repeated measurements for at least one measurement point belonging to the measurement line.

3. The spatial accuracy correction method according to claim 2, further comprising:
   calculating a correction parameter of the spatial accuracy correction of the positioning mechanism based on the measured value, the measured length value, and the coordinates of the reference point of the laser interferometer, wherein the calculating of the correction parameter comprises applying a first correction constant to the measured length value and a second correction constant to the coordinates of the reference point for each measurement line.

4. The spatial accuracy correction method according to claim 3, wherein at least one or more measurement point that undergoes the repeated measurement includes the measurement point initially measured on the measurement line.

5. The spatial accuracy correction method according to claim 4, further comprising:
   a preliminary measurement process comprising conducting the repeated measurement a plurality of times for the plurality of measurement points, before conducting the measurement process,
   wherein the threshold value is calculated based on a standard deviation of error by the repeated measurement of the plurality of measurement points in the preliminary measurement process.

6. The spatial accuracy correction method according claim 3, wherein the conducting at least one or more repeated measurements comprises measuring the plurality of measurement points in a reverse order of the measurement of the plurality of measurement points that are measured most recently.

7. The spatial accuracy correction method according to claim 6, further comprising:
   a preliminary measurement process comprising conducting the repeated measurement a plurality of times for the plurality of measurement points, before conducting the measurement process,
   wherein the threshold value is calculated based on a standard deviation of error by the repeated measurement of the plurality of measurement points in the preliminary measurement process.

8. The spatial accuracy correction method according to claim 3, further comprising:
   a preliminary measurement process comprising conducting the repeated measurement a plurality of times for the plurality of measurement points, before conducting the measurement process,
   wherein the threshold value is calculated based on a standard deviation of error by the repeated measurement of the plurality of measurement points in the preliminary measurement process.

9. The spatial accuracy correction method according to claim 2, wherein at least one or more measurement point that undergoes the repeated measurement includes the measurement point initially measured on the measurement line.

10. The spatial accuracy correction method according to claim 9, further comprising:
    a preliminary measurement process comprising conducting the repeated measurement a plurality of times for the plurality of measurement points, before conducting the measurement process,
    wherein the threshold value is calculated based on a standard deviation of error by the repeated measurement of the plurality of measurement points in the preliminary measurement process.

11. The spatial accuracy correction method according claim 2, wherein the conducting at least one or more repeated measurements comprises measuring the plurality of measurement points in a reverse order of the measurement of the plurality of measurement points that are measured most recently.

12. The spatial accuracy correction method according to claim 11, further comprising:
  a preliminary measurement process comprising conducting the repeated measurement a plurality of times for the plurality of measurement points, before conducting the measurement process,
  wherein the threshold value is calculated based on a standard deviation of error by the repeated measurement of the plurality of measurement points in the preliminary measurement process.

13. The spatial accuracy correction method according to claim 2, further comprising:
  a preliminary measurement process comprising conducting the repeated measurement a plurality of times for the plurality of measurement points, before conducting the measurement process,
  wherein the threshold value is calculated based on a standard deviation of error by the repeated measurement of the plurality of measurement points in the preliminary measurement process.

14. The spatial accuracy correction method according to claim 1, further comprising:
  a preliminary measurement process comprising conducting the repeated measurement a plurality of times for the plurality of measurement points, before conducting the measurement process,
  wherein the threshold value is calculated based on a standard deviation of error by the repeated measurement of the plurality of measurement points in the preliminary measurement process.

15. A spatial accuracy correction apparatus comprising:
  a positioning machine that displaces a displacer to a predetermined set of spatial coordinates, the positioning machine comprising a retroreflector mounted to the displacer, the positioning mechanism being configured to measure a measurable value of the spatial coordinates of the retroreflector;
  a laser interferometer having a reference point and configured to measure a measurable length value that is a distance from the reference point to the retroreflector; and
  a controller operably connected to the positioning machine and the laser interferometer, the controller comprising a processor and a memory that stores an instruction, wherein the processor, when executing the instruction stored in the memory, performs operations comprising:
    displacing the retroreflector to a plurality of measurement points in order,
    acquiring the measured length value and measured value measured at each of the measurement points,
    conducting at least one or more repeated measurement for at least one of the plurality of measurement points being measured after conducting measurement of the measured length value and the measured value for each of the plurality of measurement points, and
    when an error by the repeated measurement of the measured length value with respect to the measurement point that has undergone the repeated measurement is equal to or greater than a predetermined threshold value, again measuring the plurality of measurement points.

* * * * *